Figure 1:
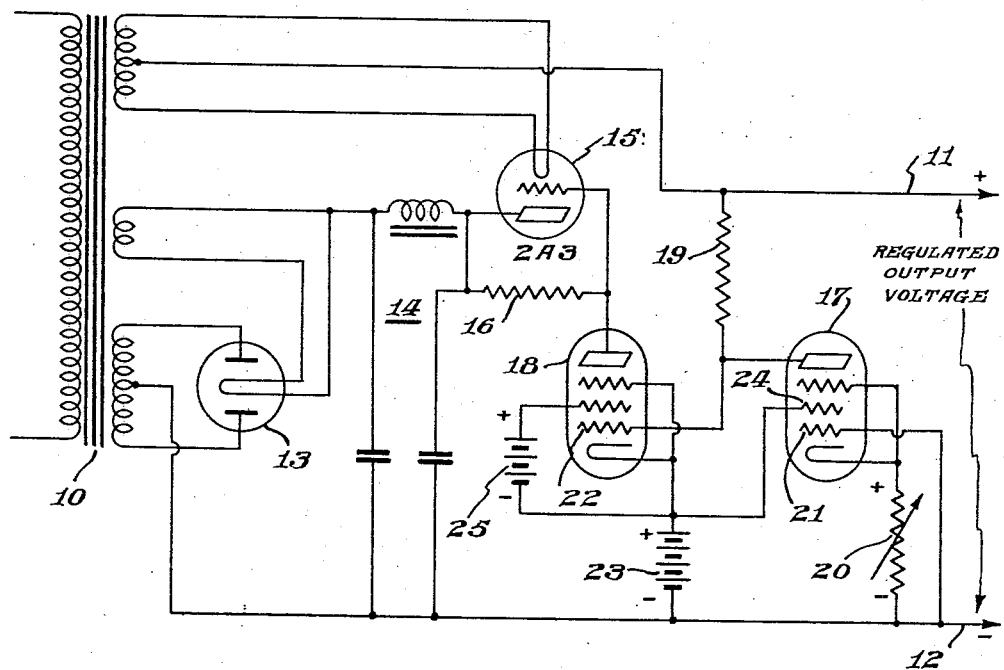

Sept. 5, 1939.　　　K. R. WENDT　　　2,171,614

ELECTRICAL REGULATING SYSTEM

Filed July 30, 1938

Inventor
Karl R. Wendt
By
Attorney

Patented Sept. 5, 1939

2,171,614

UNITED STATES PATENT OFFICE 2,171,614

ELECTRICAL REGULATING SYSTEM

Karl R. Wendt, Audubon, N. J., assignor to Radio Corporation of America, a corporation of Delaware Application July 30, 1938, Serial No. 222,119

3 Claims. (Cl. 171—312)

This invention relates to electrical regulating systems such as are utilized to regulate the voltage or current of a load circuit. It has for its principal object the provision of an improved regulating system and method of operation whereby the control potential is derived from a substantially constant current circuit which is connected in shunt to the load (in the case of a voltage regulator) and which includes an electron discharge device of the pentode type having its various electrodes so connected that its impedance varies in response to change in the load circuit voltage.

It is known that a pentode device is susceptible of maintaining a substantially constant current in its cathode-anode circuit if its control grid be subjected to a potential which is dependent on such current and becomes more negative as this current increases.

In accordance with the invention, a resistor connected in the cathode lead of the pentode device is utilized to apply to its control grid a potential which becomes more negative with increase in the load circuit voltage, and vice versa, and the resulting variation in the cathode-anode impedance of the pentode is utilized to control the input potential of a control circuit amplifier through which the impedance of the regulating device is varied to maintain the load circuit voltage within narrow limits. This is relatively simple and has the advantage that the load circuit voltage is readily regulated at any desired value by adjustment of the pentode cathode lead resistor.

The invention will be better understood from the following description, considered in connection with the accompanying drawing, and its scope is indicated by the appended claims.

Figure 2:
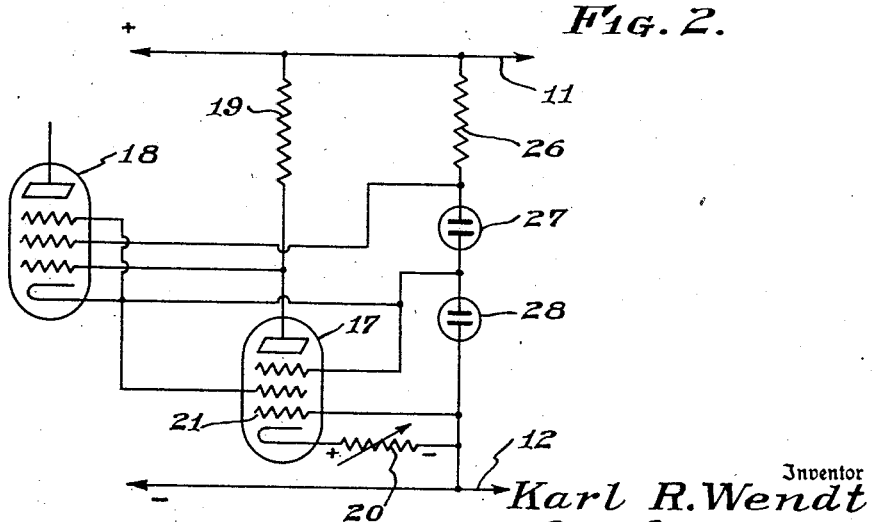

Referring to the drawing,

Figure 1 is a wiring diagram of a regulating system which involves the invention, and Figure 2 is a similar diagram illustrating an alternative mode of deriving the screen grid potentials of the control circuit pentode and amplifier.

The system of Fig. 1 includes an alternating current supply transformer 10, from which direct current is supplied at regulated voltage to a load circuit 11—12. Interposed between the supply transformer and load circuit are a rectifier 13, a filter 14, and a regulating device 15 which has its cathode-anode circuit connected in series with the load circuit and is provided with a control grid circuit including a resistor 16.

For regulating the potential drop of the resistor 16 and the potential of the control grid of the regulating device 15, there is provided a control circuit including a substantially constant current pentode device 17 and an amplifier 18.

It will be noted that the cathode-anode circuit of the pentode 17 is connected between the direct current load circuit terminals through a load resistor 19 and a cathode lead resistor 20; that the potential of the pentode control grid 21 is derived from the resistor 20; that the potential of the control grid 22 of the amplifier 18 is determined by the impedance of the pentode 17; that the cathode-anode circuit of the amplifier 18 is connected between the filter output terminals through the resistor 16 and a battery 23 which applies a suitable positive potential to the screen grid 24 of the pentode 17; and that a battery 25 is provided for maintaining a suitable positive potential at the screen grid of the amplifier 18.

Since the control grid potential of the pentode 17 is dependent on the potential drop of the resistor 20, it follows that the current of the circuit 19—17—12 is maintained substantially constant irrespective of variations in the load circuit voltage. Thus, if the load circuit voltage tends to increase, there is a slight increase of the current through the resistor 20, the pentode control grid 21 becomes more negative, the cathode anode impedance of the pentode 17 is increased, and the current of the circuit 19—17—20 is maintained within narrow limits at a value depending on the adjustment of the resistor 20. The reverse action occurs if the load circuit voltage tends to decrease.

It is apparent that the potential of the amplifier control grid 22 varies with change in the impedance of the pentode 17, becoming more positive when this impedance increases and less positive when this impedance decreases. From this it follows that the current of the amplifier 18 and the resistor 16 is increased when the load circuit voltage tends to increase, and vice versa. Otherwise stated, since the current through the resistor 19 is maintained constant and the voltage across this resistor is therefore constant, any a.-c. or d.-c. changes in output voltage across terminals 11—12 will be applied directly to grid 22 except at d.-c. potential which is lower than the potential of the terminal 11. This is advantageous in that it avoids the necessity of an auxiliary potential source between the lead 11 and the grid 22 for properly polarizing the d.-c. amplifier 18.

Increase in the current of the resistor 16 renders the control grid potential of the regulating device 15 more negative, and vice versa, thus maintaining the load circuit voltage variations within narrow limits at a regulated value depending on the adjustment of the resistor 20.

The modification of Fig. 2 differs from that of Fig. 1 in that the use of batteries for applying potential to the screen grids of the pentode 17 and the amplifier 18 is avoided. In this modification, these screen grid potentials are derived from a circuit which is connected between the load circuit terminals and which includes a resistor 26, a glow tube 27 for stabilizing the screen grid potential of the amplifier 18, and a glow tube 28 for stabilizing the screen grid potential of the pentode 17.

Other modifications may, of course, be made without departing from the spirit and scope of the invention which is defined by the appended claims.

I claim as my invention:

1. In a regulating system wherein current is supplied to a load circuit through the cathode-anode circuit of a regulating device provided with a control grid circuit, the combination of a substantially constant current circuit including an electron discharge device and a resistor common to the cathode lead and control grid circuits of said electron discharge device, an amplifier provided with cathode-anode and control grid circuits, means for applying to said amplifier control grid circuit a potential dependent on the impedance of said electron discharge device, and means common to said amplifier cathode-anode and regulating device control grid circuits for applying to the latter a potential which varies inversely as the impedance of said electron discharge device.

2. In a regulating system wherein current is supplied to a load circuit through the cathode-anode circuit of a regulating device provided with a control grid circuit, the combination of a substantially constant current circuit including an electron discharge device and a resistor common to the cathode lead and control grid circuits of said electron discharge device, an amplifier provided with cathode-anode and control grid circuits, means for applying to said amplifier control grid circuit a potential dependent on the impedance of said electron discharge device, and a resistor common to said amplifier cathode-anode and regulating device control grid circuits for applying to the latter a potential responsive to change in the impedance of said electron discharge device.

3. In a regulating system wherein current is supplied to a load circuit through a regulating device provided with a control grid circuit, the combination of a substantially constant current circuit including a pentode electron discharge device and a resistor common to the cathode lead and control grid circuits of said pentode, an amplifier provided with a control grid circuit responsive to change in the impedance of said pentode and with a cathode-anode circuit including a resistor, and means whereby said resistor is connected in the control grid circuit of said regulating device.

KARL R. WENDT.